(12) United States Patent
Osawa

(10) Patent No.: US 12,158,189 B2
(45) Date of Patent: Dec. 3, 2024

(54) FRICTION MATERIAL

(71) Applicant: NISSHINBO BRAKE, INC., Tokyo (JP)

(72) Inventor: Yuka Osawa, Gunma-Ken (JP)

(73) Assignee: NISSHINBO BRAKE, INC., Tokyo (JP)

( * ) Notice: Subject to any disclaimer, the term of this patent is extended or adjusted under 35 U.S.C. 154(b) by 600 days.

(21) Appl. No.: 17/497,932

(22) Filed: Oct. 9, 2021

(65) Prior Publication Data

US 2022/0128109 A1   Apr. 28, 2022

(51) Int. Cl.
*F16D 69/02* (2006.01)
(52) U.S. Cl.
CPC .................. *F16D 69/028* (2013.01)
(58) Field of Classification Search
None
See application file for complete search history.

(56) References Cited

U.S. PATENT DOCUMENTS

| 7,326,741 B2 * | 2/2008 | Kusaka | F16D 69/026 |
| | | | 523/155 |
| 2014/0174319 A1 * | 6/2014 | Yamamoto | F16D 69/025 |
| | | | 106/36 |
| 2020/0032867 A1 * | 1/2020 | Lee | F16D 69/026 |

FOREIGN PATENT DOCUMENTS

| JP | 2010-285558 | 12/2010 |
| JP | 2017-88727 | 5/2017 |
| JP | 2019-31616 | 2/2019 |

* cited by examiner

*Primary Examiner* — Alexandra M Moore
(74) *Attorney, Agent, or Firm* — Apex Juris, pllc; Tracy M Heims

(57) ABSTRACT

To provide the friction material for the disc brake pad manufactured by forming the NAO friction material composition that does not contain the copper component and does not generate the creeping groan and the seizure to mating surface due to corrosion but possessing sufficient braking effectiveness and wear resistance. The friction material composition relative to the entire amount of the friction material composition, has 2-10 weight % of the calcium silicate as one of the inorganic friction modifiers, 15-30 weight % of the non-whisker-like titanate as one of the inorganic friction modifiers, 1-9 weight % of the metal sulfide as one of the lubricants and 3-10 weight % of the graphite as one of the lubricants.

2 Claims, No Drawings

FRICTION MATERIAL

FIELD OF INVENTION

This invention relates to a friction material used for a disc brake pad, which is manufactured by forming a non-asbestos-organic (NAO) friction material composition that contains a binder, a fiber base, an organic friction modifier, an inorganic friction modifier, and a lubricant but does not contain a copper component.

BACKGROUND OF INVENTION

Conventionally, a disc brake is used as a braking device for a passenger car, and a disc brake pad, which is formed by fixing a friction material on a metal base member, is used as a friction member thereof.

Recently, a demand for a silent brake increases, and it is a trend to use a disc brake pad employing a NAO friction material that does not contain a steel type fiber such as a steel fiber and a stainless steel fiber as a fiber base. Conventionally, for a NAO friction material, in order to secure the required performance, 5-20 weight % of a copper component such as a fiber or a particle of a copper or a copper alloy relative to the entire amount of the friction material composition is added as a necessary component.

However, recently, it is suggested that the above-described friction material, when braking, discharges the copper as a friction powder and that the discharged copper flows in a river, lake, and/or ocean, and then the copper possibly contaminates an area around the discharged copper. Accordingly, the NAO friction material that reduces the amount of the copper component such as the Patent Document 1 has been developed.

On the other hand, improvements for a low frequency noise, i.e., "creeping groan", is on demand for the friction material.

The creeping groan is unpleasant low frequency noise that is generated in an automatic (AT) car when toque is generated in a driving direction due to creeping phenomena, and vibrations that occur as the relative speed between the friction material and the mating member, i.e., the disc rotor, changes, are transferred to an automobile chassis and body to be radiated.

The creeping groan is considered to be generated based on the following mechanism.

By repeating the braking actions, a friction powder and decomposed objects of the friction powder created because of friction between the friction material and the disc rotor form a film covering and adhering to the rotor surface. If a thickness and/or a size of the film excessively increase, torque omission of the brake torque, when the film is broken, increases. Accordingly, a stick slip phenomenon is increased to generate the low frequency noise.

The patent document 2 discloses a friction material that at least contain a friction modifier and a copper of a heavy metal and that further contains at least one type of a hydroxyapatite, 1-10 volume %, relative to the entire amount of the friction material composition, of a theodolite, and also 0.5-2 volume %, relative to the entire amount of the friction material composition, of a xonotlite-based synthetic calcium silicate.

According to the invention in the patent document 2, by containing the hydroxyapatite that absorbs a copper metal type ion, the invention in the patent document 2 can provide the friction material that can inhibit the environmental pollution due to the copper metal contained in the friction material and at the same time can provide an excellent anti-fading property due to an increased porosity.

However, the friction material in the patent document 2 contains copper, and although the hydroxyapatite absorbs the copper metal type ion, the hydroxyapatite together with the copper metal type ion can be discharged as the friction powder, which can cause the environmental pollution.

Also, the patent document 2 does not disclose a specific shape of the xonotlite-based synthetic calcium silicate, but a typical xonotlite-based synthetic calcium silicate is a fibrous shape, and therefore the xonotlite-based synthetic calcium silicate disclosed in the patent document 2 can be considered fibrous substance.

The patent document 3 discloses the friction material that contains a granulated hematite sintered particle with an average particle diameter of 25-300 μm and a pore volume of 30-300 mm3/g and contains 0.5 mass % or less, relative to the entire amount of the friction material composition, of the copper component.

According to the invention in the patent document 3, the invention can provide the friction material with the reduced amount of the copper component that can reduce the creeping groan, maintain sufficient anti-fading property, and inhibit the aggressiveness against the mating member even if light load braking actions are repeated to exceed the predetermined number.

However, the granulated hematite sintered particle disclosed in the patent document 3 contains an iron component, and therefore if the large amount of the granulated hematite sintered particles are added in the friction material, after leaving the automobile while the parking brake is on for a long time, because of the iron component in the hematite, the friction powder components of the friction powder of the disc rotor and the friction powder of the friction material form the film including the rust to an interface between the friction material and the disc rotor, which causes the seizure to mating surface due to corrosion between the friction material and the disc rotor.

PRIOR ARTS

Patent Documents

[patent document 1] Japanese provisional patent publication no. 2017-88727

[patent document 2] Japanese provisional patent publication no. 2010-285558

[patent document 3] Japanese provisional patent publication no. 2019-31616

SUMMARY OF INVENTION

Problems to be Resolved by the Invention

In the friction material used for the disc brake pad, which is manufactured by forming the NAO friction material composition that does not contain the copper component, it is an object of this invention to provide the friction material that can reduce the creeping groan and the seizure to the mating surface due to corrosion and can provide sufficient braking effectiveness and wear resistance.

Means to Resolve the Problems

The inventors, after serious investigation, completed this invention as finding that the above-identified problems may be resolved by using the friction material composition for the friction material used for the disc brake pad, which is manufactured by forming the NAO friction material composition that does not contain the copper component, which can provide sufficient braking effectiveness and wear resistance while inhibiting the generation of the creeping groan and the seizure to the mating surface due to corrosion by containing 2-10 weight %, relative to the entire amount of the friction material composition, of the calcium silicate particle as one of inorganic friction modifiers, 15-30 weight %, relative to the entire amount of the friction material composition, of a non-whisker-like titanate as one of the inorganic friction modifiers, 1-9 weight %, relative to the entire amount of the friction material composition, of a metal sulfide as one of lubricants, and 3-10 weight %, relative to the entire amount of the friction material composition, of a graphite as one of the lubricants.

This invention relates to the friction material used for the disc brake pad which is manufactured by forming the NAO friction material composition that does not contain the copper component and is based on the following technology.

(1) The friction material for the disc brake pad, which is manufactured by forming the non-asbestos-organic (NAO) friction material composition that contains a binder, a fiber base, an organic friction modifier, an inorganic friction modifier, and a lubricant but does not contain a copper component, wherein the friction material composition comprises 2-10 weight %, relative to the entire amount of the friction material composition, of a calcium silicate particle as one of the inorganic friction modifier, 15-30 weight %, relative to the entire amount of the friction material composition, of a non-whisker-like titanate as one of the inorganic friction modifiers, 1-9 weight %, relative to the entire amount of the friction material composition, of a metal sulfide as one of the lubricant, and 3-10 weight %, relative to the entire amount of the friction material composition, of a graphite as one of the lubricant.

(2) The friction material according to (1), wherein the non-whisker-like titanates are a potassium hexatitanate and/or a lithium potassium titanate.

Advantage of the Invention

According to this invention, in the friction material used for the disc brake pad, which is manufactured by forming the NAO friction material composition that does not contain the copper component, this invention can provide the friction material that can reduce the creeping groan and the seizure to the mating surface due to corrosion and provide sufficient braking effectiveness and the wear resistance

EMBODIMENTS OF THE INVENTION

According to this invention, in the friction material for the disc brake pad, which is manufactured by forming the NAO friction material composition that does not contain the copper component, this invention uses the friction material composition that contains 2-10 weight %, relative to the entire amount of the friction material composition, of the calcium silicate particle as one of the inorganic friction modifier, 15-30 weight %, relative to the entire amount of the friction material composition, of the non-whisker-like titanate as one of the inorganic friction modifiers, 1-9 weight %, relative to the entire amount of the friction material composition, of the metal sulfide as one of the lubricants, and 3-10 weight %, relative to the entire amount of the friction material composition, of the graphite as one of the lubricants.

As one of the inorganic friction modifiers, 2-10 weight %, relative to the entire amount of the friction material composition, the calcium silicate particle is added to the friction material composition.

A xonotlite and tobermorite can be considered as the industrially used calcium silicate.

A chemical formula of the xonotlite is $Ca_6(Si_6O_{17})(OH)_2$, which is a porous particle that has a needle shape crystal inside and is characterized to absorb substances on its surface.

A chemical formula of the tobermorite is $Ca_5(Si_6O_{18}H_2)\cdot 4H_2O$, which is a porous particle that has a platy crystal structure called a cardhouse-like structure and is also characterized to absorb substances on its surface.

By adding such calcium silicate to the friction material composition, the calcium silicate particles existing on the friction surface of the friction material absorb the substance that forms the film on the disc rotor surface, thereby inhibiting the excessive formation of the film. As the result, the creeping groan generation can be inhibited. Here, the calcium silicate particle should not be the cause of the seizure to mating surface due to corrosion starting from the iron component of the hematite particle unlike the granulated hematite sintered particle that contains iron component; however, the calcium silicate particle absorbs water, which can be the cause of rusting, and therefore the amount of the calcium silicate particle added thereto is preferably within the range not to cause the rusting of the disc brake.

For the calcium silicate particle, Promaxon™ (xonotlite synthetic hydrated calcium silicate particle, Company "Promat", the average particle diameter of 35-85 μm) may be used.

In order to improve occurrence of the creeping groan, as relatively large amount of the calcium silicate particle is added to the friction material composition, the porosity of the friction material is increased, which tends to decrease the wear resistance of the friction material.

In this invention, together with the above-described calcium silicate particle, 15-30 weight %, relative to the entire amount of the friction material composition, of the non-whisker-like titanate functioning as the inorganic friction modifier, 1-9 weight %, relative to the entire amount of the friction material composition, of the metal sulfide functioning as the lubricant, and 3-10 weight %, relative to the entire amount of the friction material composition, of the graphite functioning as the lubricant are added to the friction material composition.

By adjusting the amount of the non-whisker-like titanate, the metal sulfide, and the graphite contained in the friction material composition within the above-described range, preferable wear resistance result can be obtained.

The non-whisker-like titanate may be either one of a potassium hexatitanate, a potassium octatitanate, a magnesium potassium titanate, or a lithium potassium titanate, or any combination of two or more of the above-identified non-whisker-like titanates may be used.

Among the above-identified non-whisker-like titanates, a single usage of the potassium hexatitanate or the lithium potassium titanate, or a combination of the potassium hexatitanate and the lithium potassium titanate are preferable in view of the improvement of the braking effectiveness and the wear resistance. If the amount of the titanate becomes less than 15 weight % relative to the entire amount of the friction material composition, the formation of the titanate film transferred and adhered to the disc rotor tends to become ununiform, which may adversely affect on the braking effectiveness.

Also, if the amount of the titanate is more than 30 weight % relative to the entire amount of the friction material composition, the formation of the titanate film transferred and adhered to the disc rotor tends to increase that makes an excessive thickness of the titanate film, and during the braking action, the film can be cracked and partially exfoliated. Therefore, the contact between the friction material and the mating member becomes unstable, which makes the friction coefficient of the friction material unstable, possibly generating the creeping groan.

In addition, as the non-whisker-like titanate, any one of Terracess™ TF-S (platy potassium hexatitanate), Terracess JP (potassium hexatitanate in an indefinite form with multiple protrusions), Terracess L (squamous shape lithium potassium titanate), and Terracess PS (squamous shape magnesium potassium titanate) sold by Otsuka Chemical Co., Ltd., TXAX™-MA (platy potassium hexatitanate) and TXAX-A (platy potassium hexatitanate) sold by Kubota Corporation, or TOFIX™-S (particle potassium hexatitanate) and TOFX-SNR (platy potassium hexatitanate) sold by Toho Titanium Co., Ltd.

As the metal sulfide, any one of a zinc sulfide, a molybdenum disulfide, an antimony trisulfide, an iron sulfide, or a tin sulfide, or any combination of two or more of the above-identified metal sulfide can preferably be used.

As the graphite, either a natural graphite or an artificial graphite alone or both natural graphite and artificial graphite may be used.

The friction material of this invention comprises, in addition to the above-identified calcium silicate particle, non-whisker-like titanate, metal sulfide, and graphite, a friction material composition containing a binder, a fiber base, a lubricant, an inorganic friction modifier, an organic friction modifier, a pH adjuster, and a filler that are normally used for a friction material.

As the binder, the binder normally used for the friction material such as a straight phenol resin, a cashew oil modified phenol resin, an acrylic rubber modified phenol resin, a silicone rubber modified phenol resin, a nitrile rubber (NBR) phenol resin, a phenol aralkyl resin (aralkyl modified phenol resin), a fluoropolymer dispersed phenol resin, and a silicone rubber dispersed phenol resin can be used alone or any combination of two or more of the above-identified binders can be used. The amount of the binder contained therein is preferably 4-9 weight % relative to the entire amount of the friction material composition, more preferably 5-8 weight % relative to the entire amount of the friction material composition.

As the fiber base, the fiber base that is normally used for the friction material such as an aramid fiber, a cellulose fiber, a poly-phenylene benzobisoxazole fiber, and an acrylic fiber can be used alone or any combination of two or more of the above-identified fiber bases can be used. The amount of the fiber base contained therein is preferably 1-7 weight % relative to the entire amount of the friction material composition, more preferably 2-4 weight % relative to the entire amount of the friction material composition.

As the lubricant, in addition to the above-identified metal sulfide and the graphite, the lubricant that is normally used for the friction material such as carbon-based lubricants such as a resilient graphitic carbon, a petroleum coke, an activated carbon, and a polyacrylonitrile oxide fiber pulverized powder can be used alone or any combination of two or more of the above-identified carbon-based lubricant can be used. The amount of the lubricant contained therein together with the above-identified metal sulfide and graphite preferably is 5-20 weight % relative to the entire amount of the friction material composition, more preferably 7-16 weight % relative to the entire amount of the friction material composition.

As the inorganic friction modifier, in addition to the above-identified calcium silicate particle and the non-whisker-like titanate, the inorganic friction modifier such as a phlogopite, a muscovite, a triiron tetroxide, a glass bead, a silicone oxide, a magnesium oxide, a stabilized zirconium oxide, a zirconium silicate, a γ-alumina, an α-alumina, a silicon carbide, a tin particle, a zinc particle, and an aluminum particle, or fiber inorganic friction modifiers such as wollastonite, a sepiolite, a basalt fiber, a glass fiber, biosoluble artificial mineral fiber and a rock wool can be used alone or any combination of two or more of the above-identified inorganic friction modifiers can be used. The amount of the inorganic friction modifier contained therein, together with the calcium silicate and the non-whisker-like titanate, preferably is 40-70 weight % relative to the entire amount of the friction material composition, more preferably 45-65 weight % relative to the entire amount of the friction material composition.

As the organic friction modifier, the organic friction modifier that is normally used for the friction material such as a cashew dust, a tire tread rubber pulverized powder, and vulcanized rubber powders or unvulcanized rubber powders such as a nitrile rubber, an acrylic rubber, a silicone rubber, and a butyl rubber can be used alone or any combination of two or more of the above-identified organic friction modifiers can be used. The amount of the organic friction modifier contained therein preferably is 2-8 weight % relative to the entire amount of the friction material composition, more preferably 3-7 weight % relative to the entire amount of the friction material composition.

As the pH adjuster, the pH adjuster that is normally used for the friction material such as a calcium hydroxide may be used. The amount of the pH adjuster contained therein preferably is 1-7 weight % relative to the entire amount of the friction material composition, more preferably 2-4 weight % relative to the entire amount of the friction material composition.

As the remaining material in the friction material composition, filler such as a barium sulfate and a calcium carbonate may be used.

The friction material of this invention, which is used for a disc brake, is manufactured through a mixing step to uniformly mix the predetermined amount of the friction material composition with a mixer, a heat-press-forming step to superpose the obtained raw friction material mixture on a separately prepared, prewashed, pre-surface-treated, and pre-adhesive-coated back plate to be positioned in a heat-forming die and to heat-press-form the raw friction material mixture and the back plate, a heat treatment step to heat the obtained heat-press-formed item to complete a curing reaction of the binder, an electrostatic powder coating step to coat powder coatings on the cured item, a baking step to bake the coated item, and a grinding step to grind a surface of the baked item to form a friction surface. Here, after the heat-press-forming step, a heat treatment step including both the coating step and the baking step may be followed by the grinding step to manufacture the friction material.

As necessary, prior to the heat-press-forming step, a granulating step to granulate the raw friction material mixture, a kneading step to knead the raw friction material mixture, and a preliminary molding step to position either the raw friction material mixture, the granulated item obtained through the granulating step or the kneaded item obtained through the kneading step in a preliminary forming die and to form a preliminary formed item, may be performed, and a scorching step may be performed after the heat-press-forming step.

EMBODIMENTS

This invention is explained concretely using the Embodiments and the Comparative Examples of this invention in the following sections; however, this invention is not limited to the following Embodiments.

Embodiments 1-15 and Comparative Examples 1-8 of the Manufacturing Method of the Friction Material The friction material compositions shown in Tables 1-3 are mixed for about 5 minutes with the Loedige mixer and is pressed in a pre-forming die under 30 MPa for about 10 seconds to obtain the preliminary formed item. The preliminary formed item is superposed on the steel back plate, which is prewashed, pre-surface treated, and pre-adhesive coated, to be heat-press-formed in the heat forming die at 150 centigrade under the forming pressure of 40 MPa for about 10 minutes, and a surface of the obtained heat-press-formed item is grinded to form a friction surface thereon. Then, a coating material is coated on the grinded item except for the friction surface portion, and the heat treatment at 200 centigrade is performed on the coated item for about 5 hours to complete the postcure treatment of the thermosetting resin and at the same time to bake the coating coted on the backing plate portion of the friction material through the coating step, finally producing the disc brake pad for a passenger car.

TABLE 1

| | | Embodiments | | | | | | | |
|---|---|---|---|---|---|---|---|---|---|
| | | 1 | 2 | 3 | 4 | 5 | 6 | 7 | 8 |
| binder | phenol resin | 8.0 | 8.0 | 8.0 | 8.0 | 8.0 | 8.0 | 8.0 | 8.0 |
| fiber base | aramid fiber | 4.0 | 4.0 | 4.0 | 4.0 | 4.0 | 4.0 | 4.0 | 4.0 |
| Lubricant carbon type lubricant | graphite | 5.0 | 3.0 | 10.0 | 5.0 | 5.0 | 5.0 | 5.0 | 5.0 |
| metal sulfide type lubricant | zinc sulfide | 5.0 | 5.0 | 5.0 | 1.0 | 9.0 | 5.0 | 5.0 | 5.0 |
| | molybdenum disulfide | 0.0 | 0.0 | 0.0 | 0.0 | 0.0 | 0.0 | 0.0 | 0.0 |
| | antimony trisulfide | 0.0 | 0.0 | 0.0 | 0.0 | 0.0 | 0.0 | 0.0 | 0.0 |
| inorganic friction modifier | zirconium silicate | 4.0 | 4.0 | 4.0 | 4.0 | 4.0 | 4.0 | 4.0 | 4.0 |
| | zirconium oxide | 20.0 | 20.0 | 20.0 | 20.0 | 20.0 | 20.0 | 20.0 | 20.0 |
| | xonotlite calcium silicate particle | 7.0 | 7.0 | 7.0 | 7.0 | 7.0 | 2.0 | 10.0 | 7.0 |
| | (platy) potassium hexatitanate | 25.0 | 25.0 | 25.0 | 25.0 | 25.0 | 25.0 | 25.0 | 15.0 |
| | (flaky) lithium potassium titanate | 0.0 | 0.0 | 0.0 | 0.0 | 0.0 | 0.0 | 0.0 | 0.0 |
| | (flaky) magnesium potassium titanate | 0.0 | 0.0 | 0.0 | 0.0 | 0.0 | 0.0 | 0.0 | 0.0 |
| organic friction modifier | cashew dust | 5.0 | 5.0 | 5.0 | 5.0 | 5.0 | 5.0 | 5.0 | 5.0 |
| | pulverized powder of tire tread rubber | 2.0 | 2.0 | 2.0 | 2.0 | 2.0 | 2.0 | 2.0 | 2.0 |
| pH adjuster | calcium hydroxide | 4.0 | 4.0 | 4.0 | 4.0 | 4.0 | 4.0 | 4.0 | 4.0 |
| filler | barium sulfate | 11.0 | 13.0 | 6.0 | 15.0 | 7.0 | 16.0 | 8.0 | 21.0 |
| Total (weight %) | | 100.0 | 100.0 | 100.0 | 100.0 | 100.0 | 100.0 | 100.0 | 100.0 |

TABLE 2

| | | Embodiments | | | | | | |
|---|---|---|---|---|---|---|---|---|
| | | 9 | 10 | 11 | 12 | 13 | 14 | 15 |
| binder | phenol resin | 8.0 | 8.0 | 8.0 | 8.0 | 8.0 | 8.0 | 8.0 |
| fiber base | aramid fiber | 4.0 | 4.0 | 4.0 | 4.0 | 4.0 | 4.0 | 4.0 |
| Lubricant carbon type lubricant | graphite | 5.0 | 5.0 | 5.0 | 5.0 | 5.0 | 5.0 | 5.0 |
| metal sulfide type lubricant | zinc sulfide | 5.0 | 5.0 | 5.0 | 5.0 | 0.0 | 0.0 | 2.0 |
| | molybdenum disulfide | 0.0 | 0.0 | 0.0 | 0.0 | 5.0 | 0.0 | 0.0 |
| | antimony trisulfide | 0.0 | 0.0 | 0.0 | 0.0 | 0.0 | 5.0 | 3.0 |
| inorganic friction modifier | zirconium silicate | 4.0 | 4.0 | 4.0 | 4.0 | 4.0 | 4.0 | 4.0 |
| | zirconium oxide | 20.0 | 20.0 | 20.0 | 20.0 | 20.0 | 20.0 | 20.0 |
| | xonotlite calcium silicate particle | 7.0 | 7.0 | 7.0 | 7.0 | 7.0 | 7.0 | 7.0 |
| | (platy) potassium hexatitanate | 30.0 | 0.0 | 0.0 | 15.0 | 25.0 | 25.0 | 25.0 |
| | (flaky) lithium potassium titanate | 0.0 | 25.0 | 0.0 | 10.0 | 0.0 | 0.0 | 0.0 |
| | (flaky) magnesium potassium titanate | 0.0 | 0.0 | 25.0 | 0.0 | 0.0 | 0.0 | 0.0 |

TABLE 2-continued

|  |  | Embodiments | | | | | | |
|---|---|---|---|---|---|---|---|---|
|  |  | 9 | 10 | 11 | 12 | 13 | 14 | 15 |
| organic friction modifier | cashew dust | 5.0 | 5.0 | 5.0 | 5.0 | 5.0 | 5.0 | 5.0 |
|  | pulverized powder of tire tread rubber | 2.0 | 2.0 | 2.0 | 2.0 | 2.0 | 2.0 | 2.0 |
| pH adjuster | calcium hydroxide | 4.0 | 4.0 | 4.0 | 4.0 | 4.0 | 4.0 | 4.0 |
| filler | barium sulfate | 6.0 | 11.0 | 11.0 | 11.0 | 11.0 | 11.0 | 11.0 |
| Total (weight %) |  | 100.0 | 100.0 | 100.0 | 100.0 | 100.0 | 100.0 | 100.0 |

TABLE 3

|  |  | Comparative Examples | | | | | | | |
|---|---|---|---|---|---|---|---|---|---|
|  |  | 1 | 2 | 3 | 4 | 5 | 6 | 7 | 8 |
| binder | phenol resin | 8.0 | 8.0 | 8.0 | 8.0 | 8.0 | 8.0 | 8.0 | 8.0 |
| fiber base | aramid fiber | 4.0 | 4.0 | 4.0 | 4.0 | 4.0 | 4.0 | 4.0 | 4.0 |
| Lubricant carbon type lubricant | graphite | 2.0 | 11.0 | 5.0 | 5.0 | 5.0 | 5.0 | 5.0 | 5.0 |
| metal sulfide type lubricant | zinc sulfide | 5.0 | 5.0 | 0.5 | 10.0 | 5.0 | 5.0 | 5.0 | 5.0 |
|  | molybdenum disulfide | 0.0 | 0.0 | 0.0 | 0.0 | 0.0 | 0.0 | 0.0 | 0.0 |
|  | antimony trisulfide | 0.0 | 0.0 | 0.0 | 0.0 | 0.0 | 0.0 | 0.0 | 0.0 |
| inorganic friction modifier | zirconium silicate | 4.0 | 4.0 | 4.0 | 4.0 | 4.0 | 4.0 | 4.0 | 4.0 |
|  | zirconium oxide | 20.0 | 20.0 | 20.0 | 20.0 | 20.0 | 20.0 | 20.0 | 20.0 |
|  | xonotlite calcium silicate particle | 7.0 | 7.0 | 7.0 | 7.0 | 1.0 | 11.0 | 7.0 | 7.0 |
|  | (platy) potassium hexatitanate | 25.0 | 25.0 | 25.0 | 25.0 | 25.0 | 25.0 | 13.0 | 32.0 |
|  | (flaky) lithium potassium titanate | 0.0 | 0.0 | 0.0 | 0.0 | 0.0 | 0.0 | 0.0 | 0.0 |
|  | (flaky) magnesium potassium titanate | 0.0 | 0.0 | 0.0 | 0.0 | 0.0 | 0.0 | 0.0 | 0.0 |
| organic friction modifier | cashew dust | 5.0 | 5.0 | 5.0 | 5.0 | 5.0 | 5.0 | 5.0 | 5.0 |
|  | pulverized powder of tire tread rubber | 2.0 | 2.0 | 2.0 | 2.0 | 2.0 | 2.0 | 2.0 | 2.0 |
| pH adjuster | calcium hydroxide | 4.0 | 4.0 | 4.0 | 4.0 | 4.0 | 4.0 | 4.0 | 4.0 |
| filler | barium sulfate | 14.0 | 5.0 | 15.5 | 6.0 | 17.0 | 7.0 | 23.0 | 4.0 |
| Total (weight %) |  | 100.0 | 100.0 | 100.0 | 100.0 | 100.0 | 100.0 | 100.0 | 100.0 |

Evaluation testing was conducted with respect to the creeping groan, the performance to prevent seizure to mating surface due to corrosion, the braking effectiveness, and the wear resistance.

<Creeping Groan>

Using an actual car, comparing tests as to sound pressure levels of the creeping groan were conducted, after leaving the actual car outside overnight, by making frictional contacts, equivalent to JASO C406, between the friction material and the mating member. Here, the evaluations of the creeping groan were conducted by measuring the creeping groan, using a noise level meter, generated when a brake pedal was gradually released while the actual car is stopping under a pad surface pressure of 1.0 MPa and a force of stepping the brake pedal is maintained when the actual car starts to move. This process was repeated 10 times.

Evaluation Standard is as Follows:

E (Excellent): no creeping groan

G (Good): creeping groan detected but 57 dB or less of the sound pressure

P (Pass): creeping groan detected but more than 57 dB but less than 73 dB

F (Fail): creeping groan detected, and the sound pressure level is 73 dB or more <Performance to Prevent Seizure to Mating Surface Due to Corrosion>

According to JIS D 4414 "Test Procedure of Seizure to Ferrous Mating Surface due to Corrosion>, the test of seizure mating surface due to corrosion was conducted, and the seizure force due to corrosion was evaluated based on the following standard.

Evaluation Standard was as Follows:

E (Excellent): less than 50N

G (Good): 50N or more but less than 150N

P (Pass): 150N or more but less than 250N

F (Fail): 250N or more

The obtained friction material was evaluated with respect to the braking effectiveness and the wear resistance in a normal usage.

<Braking Effectiveness>

Based on JASO C 406 "Passenger Car-Braking Device-Dynamometer Test Procedures", in a second effectiveness test defined in a general performance, a test of braking at a fluid pressure of 4 MPa starting from an initial speed of 50 km/h was conducted five times, and an average μ was determined.

Evaluation Standard is as Follows:

E (Excellent): 0.42 or more but less than 0.45

G (Good): 0.39 or more but less than 0.42

P (Pass): 0.36 or more but less than 0.39
F (Fail): less than 0.36

<Wear Resistance>

Based on JASO C 427 "Automobile Parts-Brake Lining and Disc Brake Pad-Wear Test Procedure on Inertia Dynamometer", the evaluation was conducted by measuring the wear amount (mm) of the friction material under the condition of a braking initial speed of 50 km/h and a braking deceleration of 0.3 G for suitable braking frequency under a pre-braking temperature of 200 degrees Cereus to convert into the wear amount per 1000 braking frequency.

Evaluation Standard is as Follows:
E (Excellent): less than 0.15 mm
G (Good): 0.15 or more but less than 0.20 mm
P (Pass): 0.20 mm or more but less than 0.50 mm
F (Fail): 0.50 mm or more Evaluation results are shown in Table 4, Table 5, and Table 6.

TABLE 4

| | | Embodiments | | | | | | | |
|---|---|---|---|---|---|---|---|---|---|
| | | 1 | 2 | 3 | 4 | 5 | 6 | 7 | 8 |
| evaluation results | creeping groan | E | E | E | E | E | P | E | E |
| | performance to prevent seizure to mating surface due to corrosion | E | E | E | E | E | E | P | E |
| | braking effectiveness | E | E | P | E | P | E | E | P |
| | wear resistance | E | G | E | G | E | E | P | E |

TABLE 5

| | | Embodiments | | | | | | |
|---|---|---|---|---|---|---|---|---|
| | | 9 | 10 | 11 | 12 | 13 | 14 | 15 |
| evaluation results | creeping groan | P | E | E | E | E | E | E |
| | performance to prevent seizure to mating surface due to corrosion | E | E | E | E | E | E | E |
| | braking effectiveness | E | E | G | E | E | E | E |
| | wear resistance | E | E | G | E | E | E | E |

TABLE 6

| | | Comparative Examples | | | | | | | |
|---|---|---|---|---|---|---|---|---|---|
| | | 1 | 2 | 3 | 4 | 5 | 6 | 7 | 8 |
| evaluation results | creeping groan | E | E | E | E | F | E | E | F |
| | performance to prevent seizure to mating surface due to corrosion | E | E | E | E | E | F | E | E |
| braking effectiveness | | G | F | G | F | G | G | F | G |
| wear resistance | | F | E | F | E | E | F | G | G |

As shown in the respective table, the composition arrangements that satisfy the composition standard of the present invention do not show the generation of the creeping groan and the seizure to mating surface due to corrosion and show preferable evaluation results that provide sufficient braking effectiveness and wear resistance.

INDUSTRIAL APPLICABILITY

According to the present invention, the present invention, in the friction material used for the disc brake pad, which is manufactured by forming the NAO friction material composition that does not contain the copper component, can provide the friction material that does not generate the creeping groan and seizure to mating surface due to corrosion while maintaining sufficient braking effectiveness and wear resistance, which provides an extremely high practical value.

The invention claimed is:

1. A friction material for a disc brake pad, which is manufactured by forming a non-asbestos-organic (NAO) friction material composition that contains a binder, a fiber base, an organic friction modifier, an inorganic friction modifier, and a lubricant but does not contain a copper component, wherein
   said friction material composition comprises
   2-10 weight %, relative to the entire amount of the friction material composition, of a xonotlite synthetic hydrated calcium silicate particle as a part of the friction modifier,
   15-30 weight %, relative to the entire amount of the friction material composition, of a non-whisker-like titanate as a part of the friction modifier,
   1-9 weight %, relative to the entire amount of the friction material composition, of a zinc sulfide as a part of the lubricant, and
   3-10 weight %, relative to the entire amount of the friction material composition, of a graphite as a part of the lubricant.

2. The friction material according to claim 1, wherein the non-whisker-like titanate is a potassium hexatitanate and/or a lithium potassium titanate.

* * * * *